United States Patent Office 3,726,826
Patented Apr. 10, 1973

3,726,826
STABILIZED ADHESIVE SOLUTIONS FOR
POLYVINYL CHLORIDE
Everett Walter Knight, Wilmington, Del., assignor to E. I.
du Pont de Nemours and Company, Wilmington, Del.
No Drawing. Continuation-in-part of application Ser. No.
53,985, July 10, 1970. This application Feb. 29, 1972,
Ser. No. 230,485
Int. Cl. C08f 45/26
U.S. Cl. 260—30.4 R
2 Claims

ABSTRACT OF THE DISCLOSURE

A solution of post-chlorinated polyvinyl chloride resin in tetrahydrofuran, an adhesive, is stabilized against gelling by including therein a small amount of 1,2-butylene oxide, ethyl acetate or mixtures thereof.

CROSS REFERENCE TO RELATED APPLICATIONS

This is a continuation-in-part of applicant's application Ser. No. 53,985, filed July 10, 1970 and now abandoned, and assigned to the assignee of the present application.

BACKGROUND

An effective adhesive for polyvinyl chloride articles such, for example, as pipe is post-chlorinated polyvinyl chloride. This is applied as a solution in a solvent such as tetrahydrofuran. On occasion, an additional solvent material, such as cyclohexanone, is added to the system for its influence on drying rate.

One limitation of adhesives of this type is poor shelf or storage life. Not infrequently it is found that such compositions have gelled after a period of storage and cannot be used without at least further treatment.

U.S. Patent 3,355,411 discloses primer compositions of ethylene vinyl acetate copolymer and post-chlorinated polyvinyl chloride in a solvent comprising tetrahydrofuran, and optionally, major amounts of several possible diluents which can include ethyl acetate. This primer is used on a resin rubber surface such as a shoe sole to provide a base for ethylene vinyl acetate copolymer adhesive compositions. Primers of this general type are not suitable for use as the adhesive itself in such demanding applications as solvent cementing of polyvinyl chloride plastic pipe and fittings.

SUMMARY OF THE PRESENT INVENTION

It has now been discovered, and it is on this discovery that the present invention is in large part predicated, that upon including a small but effective amount of 1,2-butylene oxide, ethyl acetate or a mixture thereof in a solution of post-chlorinated polyvinyl chloride in tetrahydrofuran, gelling is effectively prevented. Thus, in one embodiment the present invention comprises a novel solution effective as an adhesive for joining of polyvinyl chloride articles and composed of about 5 to 25 weight percent of post-chlorinated polyvinyl chloride (CPVC) in tetrahydrofuran (THF) and about 0.4 to 5% by weight of at least one member selected from the group consisting of 1,2-butylene oxide and ethyl acetate. In a second embodiment the invention is a method of enhancing the stability of an adhesive solution of CPVC in THF by adding thereto about 0.4 to 5% by weight of at least one member selected from the group consisting of 1,2-butylene oxide and ethyl acetate.

The adhesive solutions of CPVC in THF, alone or with about 5 to 10% of cyclohexanone, are presently known and widely used commercially. A typical CPVC that is used in such adhesive solutions is available commercially from the B. F. Goodrich Company as "Geon" 603/56 resin. That or other resin is simply dissolved in THF, with or without heat as desired, to make the solutions. Suitable CPVC resins are disclosed in such patents as U.S. Pats. Nos. 2,996,489 and 3,100,762. Those patents describe the resin in considerable detail and disclose methods for their preparation which may be used to prepare resins for use in the present invention. Typical CPVC resins for use in the invention include those having a density of 1.43 to about 1.65 gms./cc. measured at 25° C. Other suitable properties may be found in the sales literature of the B. F. Goodrich Company, a supplier of suitable "Geon" resins.

In practice of the present invention the solutions may be made in any fashion desired. For example, the CPVC may be dissolved in THF and then the oxide or acetate, or both, simply added thereto with stirring. Further, if desired the additives may be first added to the solvent. In preparation of solutions in which an additional material, such as cyclohexanone, is used to control drying rate, that additional material may be first added to the THF or it may be added to a preformed adhesive solution; in the latter instance, addition can be made either before or after the addition of the stabilizing oxide or acetate employed herein.

The following examples will illustrate the present invention. The details are given by way of illustration and not by way of limitation. All parts are by weight unless otherwise indicated or apparent.

Example I

Adhesive resin solutions were prepared by dissolving various amounts of post-chlorinated polyvinyl chloride obtained as "Geon" 603/56 from B. F. Goodrich in tetrahydrofuran to make 10%, 15% and 25% solutions thereof, all of the foregoing by weight. These samples were then stored with tin and steel strips in them. It was found that the steel apparently affected the solution in as little as 18 hours since signs of rusting were observed.

Example II

A solution of "Geon" 603/56 in tetrahydrofuran was made, at a 12% concentration of the post-chlorinated polyvinyl chloride. Then 0.4% of 1,2-butylene oxide was added to one sample, a like amount of ethyl acetate was added to a second, and the same amount of each added to a third sample. A fourth sample was treated with 0.4% of triethyl phosphate. A mild steel coupon was immersed in each sample, contained in a glass vial and the samples were stored at room temperature. After 72 hours, the samples were observed as follows:

(a) The sample containing 1,2-butylene oxide showed small areas of rust.
(b) The sample containing ethyl acetate had two small areas showing rust.
(c) The sample containing butylene oxide plus ethyl acetate appeared very good; only very minute areas of rust.
(d) The sample containing triethyl phosphate appeared rust-free.

The samples were put back in storage, and then they were re-examined after 30-day storage. The samples containing ethyl acetate appeared to be the best of the lot. 1,2-butylene oxide sample was next best. The triethyl phosphate sample was third best and combined ethyl acetate and 1,2-butylene oxide was fourth.

The above results were only room temperature test results.

Example III

In another test, a plurality of resin solutions were prepared by simply admixing the post-chlorinated polyvinyl chloride resin ("Geon" 603/56 resin—B. F. Goodrich Company) in an amount to provide a 12.5% by weight concentration in the tetrahydrofuran solvent. Then additives were incorporated in portions thereof to provide seven samples. Seven duplicates thereof were modified by the further addition of 7.5% by weight of cyclohexanone. A mild steel coupon was immersed in each sample. All samples were stored for 39 days at 120° F.; heat was off during seven days of the period. Observations made on these 14 samples plus two controls are summarized in the above table. In the table, "butylene oxide" means the commercially available material 1,2-butylene oxide.

TABLE I

| Number [1] | Solvent plus additives | Steel coupon weight loss (gms.) | Appearance |
|---|---|---|---|
| 1 | THF plus 1% butylene oxide | 0.0014 | Light brown color-free flowing. |
| 2 | THF plus 1% butylene oxide plus 1% ethyl acetate | 0.0015 | Do. |
| 3 | THF plus 1% butylene oxide plus 5% ethyl acetate | 0.0014 | Do. |
| 4 | THF plus 1% tri ethyl phosphate | | Gelled. |
| 5 | THF plus 5% tri ethyl phosphate | | Do. |
| 6 | THF plus 1% tri cresyl phosphate | | Do. |
| 7 | THF plus 5% tri cresyl phosphate | | Do. |
| 1-A | THF plus cyclohexanone plus 1% butylene oxide | 0.0019 | Brown colored-free flowing. |
| 2-A | THF plus cyclohexanone plus 1% butylene oxide plus 1% ethyl acetate | 0.009 | Do. |
| 3-A | THF plus cyclohexanone plus 1% butylene oxide plus 5% ethyl acetate | 0.0006 | Do. |
| 4-A | THF plus cyclohexanone plus 1% tri ethyl phosphate | | Gelled. |
| 5-A | THF plus cyclohexanone plus 5% tri ethyl phosphate | | Do. |
| 6-A | THF plus cyclohexanone plus 1% tri cresyl phosphate | | Do. |
| 7-A | THF plus cyclohexanone plus 5% tri cresyl phosphate | | Do. |
| 8 | Tetrahydrofuran only | | Do. |
| 9 | THF plus cyclohexanone only | | Do. |

[1] Solvents 1-A through 7-A were made by adding 7.5% by weight cyclohexanone to the THF.

What is claimed is:

1. An adhesive composition consisting essentially of 5 to 25 weight percent of post-chlorinated polyvinyl chloride resin having a density of 1.43 to 1.65 grams per cubic centimeter, tetrahydrofuran and from about 0.4 to 5 weight percent of 1,2-butylene oxide as a stabilizer against gellation.

2. A method for stabilizing an adhesive composition against gellation which comprises adding from about 0.4 to 5 weight percent of 1,2-butylene oxide to an adhesive composition containing 5 to 25 weight percent of post-chlorinated polyvinyl chloride resin in tetrahydrofuran, the resin having a density of 1.43 to 1.65 grams per cubic centimeter.

References Cited

UNITED STATES PATENTS

| 3,520,835 | 7/1970 | Chandley | 260—2.5 AC |
| 3,448,065 | 6/1969 | Green | 260—77.5 NC |
| 3,294,753 | 12/1966 | Beitchman | 260—77.5 AC |
| 3,010,963 | 11/1961 | Erner | 252—426 |

FOREIGN PATENTS

| 839,185 | 6/1960 | Great Britain | 260—2.5 AC |
| 651,638 | 11/1962 | Canada | 260—2.5 AC |

OTHER REFERENCES

Polyurethanes: Chemistry and Technology, vol. I, Saunders and Frisch; Interscience; N.Y., 1962 (pp. 165, and 227 to 232).

MORRIS LIEBMAN, Primary Examiner

P. R. MICHL, Assistant Examiner

U.S. Cl. X.R.

260—45.8 A, 45.85